United States Patent
DiGiovanni

(10) Patent No.: US 9,941,656 B2
(45) Date of Patent: Apr. 10, 2018

(54) POLARIZATION-MAINTAINING (PM) DOUBLE-CLAD (DC) OPTICAL FIBER

(71) Applicant: OFS Fitel, LLC, Norcross, GA (US)

(72) Inventor: David J DiGiovanni, Mountain Lakes, NJ (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 14/995,300

(22) Filed: Jan. 14, 2016

(65) Prior Publication Data

US 2016/0126692 A1 May 5, 2016

Related U.S. Application Data

(62) Division of application No. 14/445,199, filed on Jul. 29, 2014, now abandoned.

(51) Int. Cl.
| | |
|---|---|
| *G02B 6/24* | (2006.01) |
| *H01S 3/094* | (2006.01) |
| *C03B 37/012* | (2006.01) |
| *G02B 6/024* | (2006.01) |
| *G02B 6/036* | (2006.01) |
| *H01S 3/067* | (2006.01) |
| *G02B 6/028* | (2006.01) |

(Continued)

(52) U.S. Cl.
CPC .. *H01S 3/094007* (2013.01); *C03B 37/01217* (2013.01); *G02B 6/024* (2013.01); *G02B 6/0285* (2013.01); *G02B 6/03616* (2013.01); *G02B 6/03622* (2013.01); *G02B 6/03627* (2013.01); *G02B 6/03633* (2013.01); *H01S 3/06712* (2013.01); *H01S 3/06733* (2013.01); *H01S 3/0941* (2013.01); *C03B 2203/22* (2013.01); *C03B 2203/31* (2013.01); *G02B 6/255* (2013.01); *H01S 3/0675* (2013.01); *H01S 3/06729* (2013.01); *H01S 3/06754* (2013.01); *H01S 3/09408* (2013.01); *H01S 3/09415* (2013.01); *H01S 3/094053* (2013.01)

(58) Field of Classification Search
CPC .................................. G02B 6/24; H01S 3/67
USPC .......................................................... 385/126
See application file for complete search history.

(56) References Cited

U.S. PATENT DOCUMENTS

| 4,830,463 | A | * | 5/1989 | Lemaire | ............ | C03B 37/01807 385/123 |
| 5,949,941 | A | * | 9/1999 | DiGiovanni | ....... | G02B 6/03622 359/345 |

(Continued)

*Primary Examiner* — Kaveh C Kianni
(74) *Attorney, Agent, or Firm* — Sam S. Han, Esq.

(57) ABSTRACT

A double-clad (DC) polarization-maintaining (PM) optical fiber comprises a core, an inner cladding, an outer cladding, and stress rods. The core has a core refractive index ($n_{core}$). The inner cladding is located radially exterior to the core and has an inner cladding refractive index ($n_1$), which is less than $n_{core}$. The stress rods are located in the inner cladding, and each stress rod has a stress rod refractive index ($n_2$), which is substantially matched to $n_1$. The outer cladding is located radially exterior to the inner cladding. The outer cladding has an outer cladding refractive index ($n_{out}$), which is less than $n_1$.

3 Claims, 5 Drawing Sheets

(51) Int. Cl.
*H01S 3/0941* (2006.01)
*G02B 6/255* (2006.01)

(56) References Cited

U.S. PATENT DOCUMENTS

| | | | |
|---|---|---|---|
| 6,203,214 B1* | 3/2001 | Wesson | A61B 5/06 385/147 |
| 6,282,341 B1* | 8/2001 | Digonnet | G02B 6/02071 385/10 |
| 6,459,838 B1* | 10/2002 | Varner | C03B 37/01225 385/123 |
| 6,465,153 B1* | 10/2002 | Kewitsch | G02B 6/02114 430/290 |
| 6,661,942 B1* | 12/2003 | Gharavi | G02B 6/12007 385/122 |
| 6,751,380 B1* | 6/2004 | Imamura | G02B 6/02138 385/10 |
| 2002/0015919 A1* | 2/2002 | Kristensen | G02B 6/02109 430/321 |
| 2002/0141726 A1* | 10/2002 | Chan | G02B 6/266 385/140 |
| 2003/0026518 A1* | 2/2003 | Pezeshki | G02F 1/225 385/14 |
| 2003/0059195 A1* | 3/2003 | Brennan, III | G02B 6/02 385/146 |
| 2003/0123497 A1* | 7/2003 | Huang | G02F 1/39 372/21 |
| 2004/0028331 A1* | 2/2004 | Ishii | G02B 6/02109 385/37 |
| 2004/0258340 A1* | 12/2004 | Paolucci | G02B 6/024 385/4 |
| 2004/0258341 A1* | 12/2004 | Paolucci | G02B 6/024 385/4 |
| 2004/0258370 A1* | 12/2004 | Bush | G02B 6/2551 385/97 |
| 2005/0018714 A1* | 1/2005 | Fermann | H01S 3/06708 372/6 |
| 2005/0254764 A1* | 11/2005 | Chatigny | C03C 25/105 385/123 |
| 2006/0067618 A1* | 3/2006 | Hill | G02B 6/105 385/37 |
| 2008/0095199 A1* | 4/2008 | Abramczyk | G02B 6/105 372/6 |
| 2008/0212916 A1* | 9/2008 | Duesterberg | G02B 6/024 385/11 |
| 2009/0080469 A1* | 3/2009 | Nikolajsen | G02B 6/2817 372/6 |
| 2009/0251770 A1* | 10/2009 | Lewis | G02B 6/03633 359/341.3 |

* cited by examiner

POLARIZATION-MAINTAINING (PM) DOUBLE-CLAD (DC) OPTICAL FIBER

CROSS-REFERENCE TO RELATED APPLICATIONS

This Application is a divisional application of prior U.S. application Ser. No. 14/445,199, filed on 2014 Jul. 29, having the title "Polarization-Maintaining (PM) Double-Clad (DC) Optical Fiber," by DiGiovanni, which is incorporated herein by reference as if set forth in its entirety.

BACKGROUND

Field of the Disclosure

The present disclosure relates generally to optics and, more particularly, to fiber optics.

Description of Related Art

Optical amplifiers and lasers employ optical fibers in which a signal is guided in a core while the pump light is guided in an inner cladding. Although similar waveguide principles apply at low power and at high power, high power applications experience some distinct issues that are related to the increased power levels. Consequently, there are ongoing efforts to mitigate detrimental effects in high power optical systems.

SUMMARY

Disclosed is a polarization-maintaining (PM) double-clad (DC) optical fiber. The PM-DC fiber comprises a core, an inner cladding, an outer cladding, and stress rods. The core has a core refractive index ($n_{core}$). The inner cladding is located radially exterior to the core and has an inner cladding refractive index ($n_1$), which is less than $n_{core}$. The stress rods are located in the inner cladding and each stress rod has a stress rod refractive index ($n_2$), which is substantially matched to $n_1$. The outer cladding is located radially exterior to the inner cladding. The outer cladding has an outer cladding refractive index ($n_{out}$), which is less than $n_1$.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figure 1:
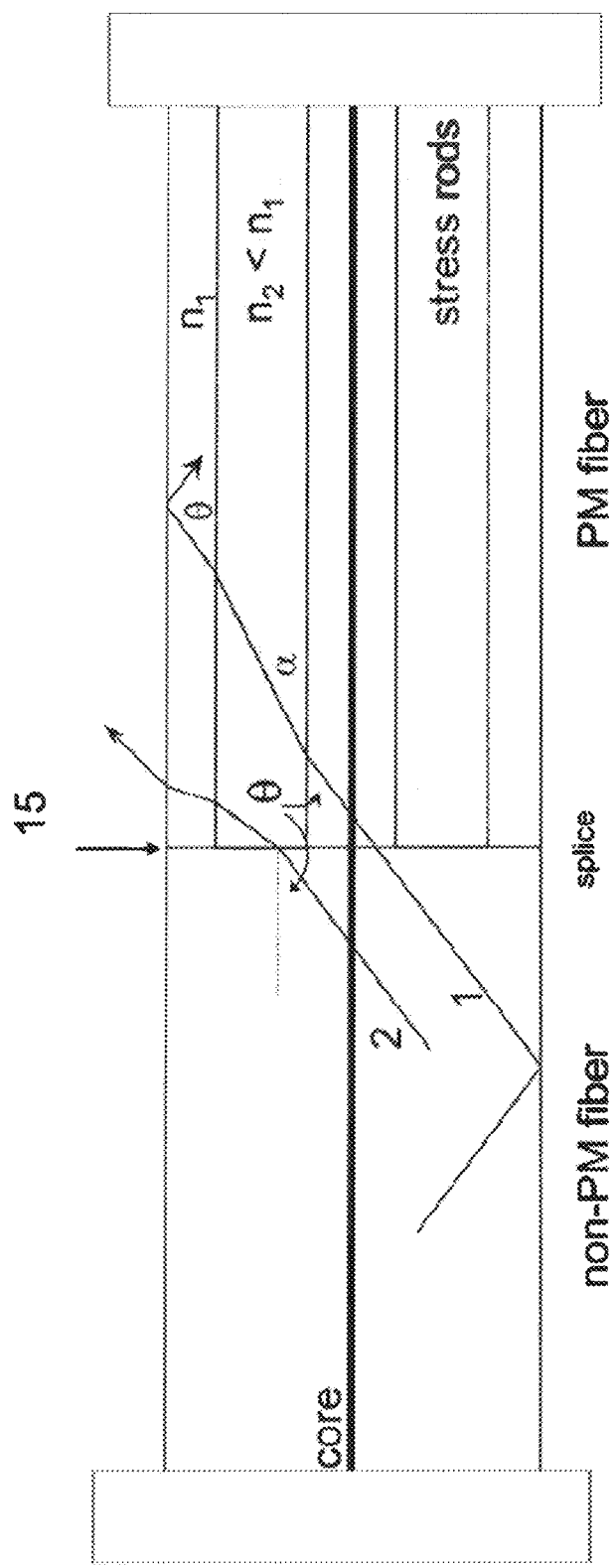
FIG. 1 is a diagram showing a trajectory of light where a stress rod refractive index is substantially smaller than the inner cladding refractive index.

Optical amplifiers and lasers employ double-clad (DC) optical fibers in which a signal is guided in a core while the pump light is guided in an inner cladding. Conventionally, the inner cladding refractive index ($n_1$) is lower than the core refractive index ($n_{core}$), thereby constraining the signal light to the core through known refractive mechanisms. Similarly, the outer cladding refractive index ($n_{out}$) is lower than $n_1$, thereby constraining the pump light to the inner cladding.

Sometimes, these DC optical fibers are polarization-maintaining (PM) fibers that incorporate stress rods located within the inner cladding and straddling the core. These stress rods have a stress rod refractive index ($n_2$) that is different from $n_1$, with the mismatch between $n_2$ and $n_1$ resulting in light refraction at the boundary between the inner cladding and the stress rods.

In conventional optical fibers, these stress rods sometimes alter and distort the properties of the guided signal because stress rods that are located too close to the core can change the mode-field shape of the signal. However, this type of distortion was not previously a problem in conventional PM-DC fibers and, consequently, the mismatch between $n_2$ and $n_1$ has previously not been a significant design consideration for conventional PM-DC fibers.

With the development of higher-power systems, the index mismatch between the inner cladding and the stress rods becomes problematic. Although similar waveguide principles apply at low power and at high power, applications at higher power levels experience some distinct issues that are not present at lower levels. For example, accumulations of heat (and other power-related effects) become a critical issue in high-power systems. As a result, the index mismatch between $n_1$ and $n_2$ (which was largely unaddressed in the design of conventional PM-DC fibers for low-power systems), becomes a limiting factor in high-power optical systems. In view of this, one approach to mitigating these high-power-related issues is by substantially (but not perfectly) matching $n_2$ to $n_1$ in PM-DC fibers. Substantially matching $n_2$ with $n_1$ decreases pump loss and reduces unwanted heating.

With this general overview in mind, reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

FIG. 1 is a diagram showing a trajectory of light where a stress rod refractive index ($n_2$) is substantially smaller than an inner cladding refractive index ($n_1$). As shown in FIG. 1, when a PM fiber is spliced to a non-PM fiber that has an index-matched inner cladding, the splice 15 results in an interface between the PM fiber and the non-PM fiber, such that any mismatch in the refractive indices at that boundary will result in a refraction of light according to Snell's law.

Two examples of refraction are shown in FIG. 1, where $n_2 < n_1$. In the first example, an incoming pump ray 1 is incident on the stress rod at an angle of θ from the side. Since $n_2 < n_1$, the ray 1 will refract to a lower angle of α. Note that the stress rods are typically round and, therefore, the angles depicted in FIG. 1 are measured normal to the interface (or boundary). Thus, while the azimuthal angle of the ray 1 will also be altered, for illustrative purposes it is sufficient to only consider the behavior of the ray 1 normal to the interface. With this in mind, when the ray 1 reaches the boundary between the stress rod and the inner cladding, the difference in the refractive indices again refracts the ray 1 to the original propagation angle of θ. Since the ray 1 was originally guided within the inner cladding at θ, the ray 1 continues to be confined to the inner cladding.

In the second example, an incoming pump ray 2 is incident on the stress rod at an angle of θ at the interface that results from the splice 15. This time, the ray 2 will refract to a higher angle upon entry into the stress rod. When the ray 2 reaches the upper boundary between the stress rod and the inner cladding, the index mismatch further refracts the ray 2 away from the stress rod at an angle that is substantially greater than the original propagation angle of θ. If the increase in the propagation angle exceeds the numerical aperture (NA) of the PM-DC fiber, then the ray 2 (which was originally guided within the inner cladding at θ) is no longer confined to the inner cladding and escapes, thereby causing undesired effects, such as catastrophic heating. Insofar as the pump light entering the stress rods can account for up to approximately twenty percent (20%) or even up to approximately 30% of the total pump light, splicing a non-PM fiber to a PM fiber with very low-index stress rods is undesirable.

Conversely, splicing a non-PM fiber to a PM fiber with very high-index stress rods (such as Aluminum-doped silica stress rods) is also undesirable. By way of example, FIG. 2 shows two examples of light trajectories for a stress rod refractive index ($n_2$) that is substantially larger than the inner cladding refractive index ($n_1$).

The first example shows an incoming pump ray 1 that is incident on the stress rod at an angle of θ from the side. Since $n_2 > n_1$, the ray 1 will refract to a higher angle. When the ray 1 reaches the boundary between the stress rod and the inner cladding, the difference in the refractive indices again refracts the ray 1 to the original propagation angle of θ. Since the ray 1 was originally guided within the inner cladding at θ, the ray 1 continues to be confined to the inner cladding.

Conversely, as shown in a second example, when an incoming pump ray 2 is incident on the stress rod at an angle of θ at the splice 15 interface, the ray 2 will refract to a lower angle upon entry into the stress rod. If that angle is sufficiently small, then the ray 2 becomes trapped when it is reflected at the upper boundary between the stress rod and the inner cladding. Consequently, the trapped ray 2 results in lower efficiency because it no longer interacts with the gain dopants. Thus, splicing a non-PM fiber to a PM fiber with very high-index stress rods is also undesirable.

Figure 2:
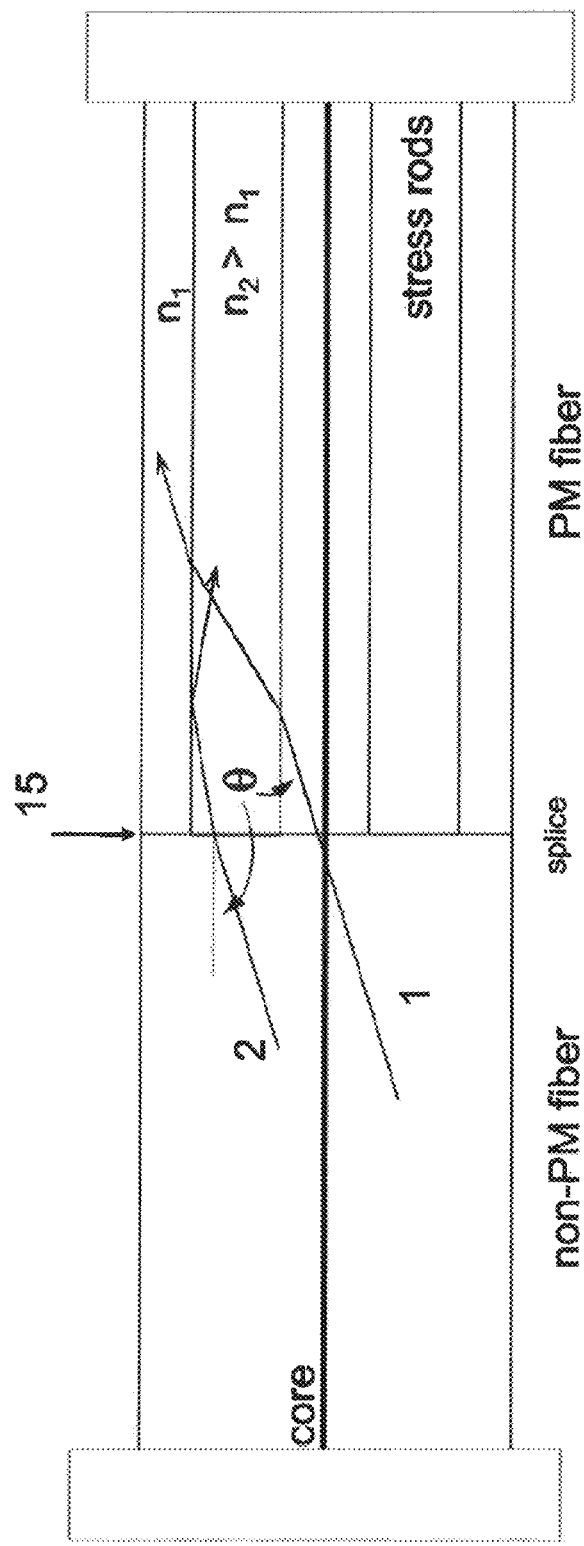
FIG. 2 is a diagram showing a trajectory of light where a stress rod refractive index is substantially larger than the inner cladding refractive index.

In the examples of FIG. 1 and FIG. 2, the amount of pump light that is scattered out of the fiber by low-index stress rods (FIG. 1) or captured within the stress rod and wasted (FIG. 2) can be calculated using ray optics. For example, the cross-sectional area of the stress rods is approximately 20% to 30% of the total PM-DC fiber cross-sectional area, and the pump light usually fills the entire guided NA (approximately 0.45 to approximately 0.48) of the inner cladding uniformly. Thus, the losses due to trapped pump light or scattered pump light can be estimated as a function of the cross-sectional areas and the inner cladding NA. Since those having skill in the art are familiar with these calculation methods, further discussions of those methods are omitted.

Figure 3:
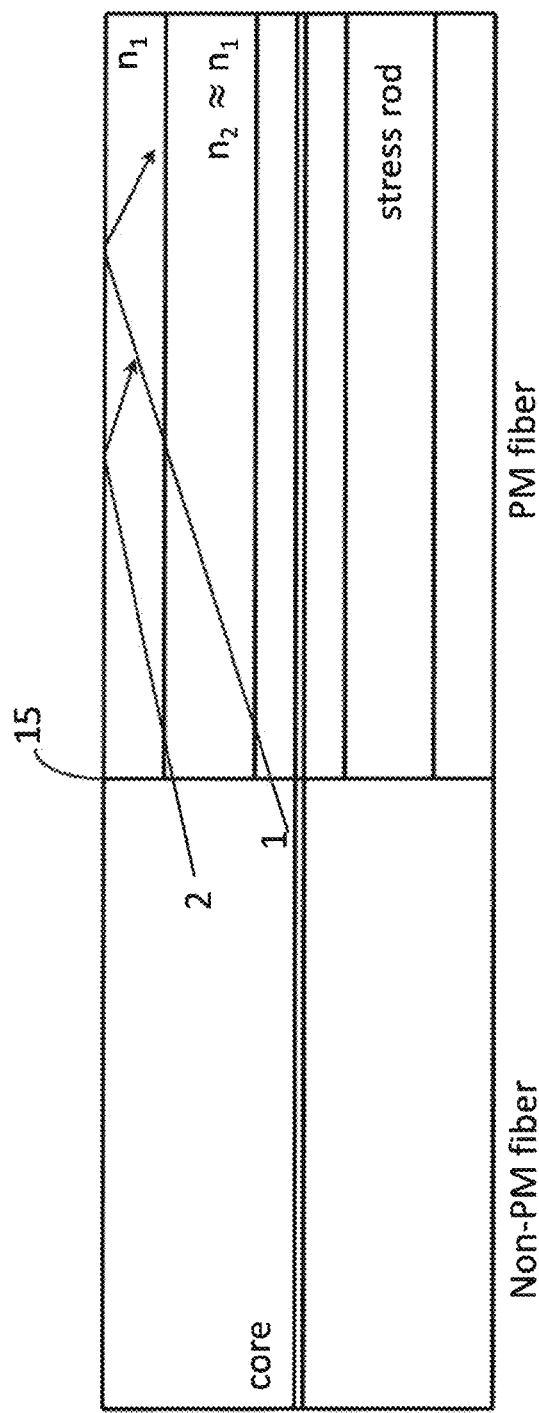
FIG. 3 is a diagram showing a trajectory of light in an embodiment where the stress rod refractive index is substantially the same as the inner cladding refractive index.

In order to mitigate the problems of FIG. 1 and FIG. 2, the stress rod refractive index ($n_2$) can be substantially matched to the inner cladding refractive index ($n_1$), as shown in FIG. 3. The two indices can be matched by doping the stress rods with known materials, such as, for example, $B_2O_3$—$GeO_2$, $B_2O_3$—$P_2O_5$, and/or $P_2O_5$—$Al_2O_3$. In accordance with Snell's law, when $n_2 \approx n_1$ there is minimal refraction at the interface because the degree of refraction is proportional to the degree of mismatch between the indices. To the extent that there is a perfect match, there will be no refraction at all.

Although it may seem optimal to perfectly match the refractive indices, in practice a slight index mismatch is desirable. This is because a slight index mismatch provides a method for detecting a polarization axis of a PM-DC fiber. For example, some commercial fusion splicers detect orientation of the stress rods by illuminating the PM-DC fiber from the side and monitoring the intensity of light as it traverses the PM-DC fiber. The PM-DC fiber is rotated until the intensity pattern appears symmetric. As one can see, if there is a perfect index match between the stress rods and the inner cladding, then it would be impossible to detect the geometric orientation of the fiber using these types of methods. Consequently, a small degree of index contrast (e.g., between approximately 0.001 and approximately 0.003) may be desirable. In practice, the degree of index mismatch depends on the type of fusion splicer and the detection algorithm. Thus, for some embodiments it is preferable to have an index mismatch as low as 0.001, while for other embodiments it is preferable to have an index mismatch that is slightly greater than 0.003. Those having skill in the art will appreciate that $n_2$ is substantially (but not perfectly) matched to $n_1$, and the degree of desired mismatch is dependent on both: (a) maximizing the pump efficiency (e.g., reduce escaping pump light, reduce trapped pump light); and (b) detectability of polarization (e.g., minimal index mismatch that still permits optical detectability of the stress rods).

For some preferred embodiments, the PM-DC fiber comprises a core, an inner cladding, an outer cladding, and stress rods. The core has a core refractive index ($n_{core}$). The inner cladding is located radially exterior to the core and has an inner cladding refractive index ($n_1$), which is less than $n_{core}$. The stress rods are located in the inner cladding and each stress rod has a stress rod refractive index ($n_2$), which is substantially matched to $n_1$. The outer cladding is located radially exterior to the inner cladding. The outer cladding has an outer cladding refractive index ($n_{out}$), which is less than $n_1$. The stress rods, for some embodiments, exhibit a panda configuration. For other embodiments, the stress rods exhibit a bow-tie configuration. For other embodiments, stress-inducing regions can be configured as an elliptical region that is located radially exterior to the core. Irrespective of the particular configuration, $n_2$ is substantially (but not perfectly) matched to $n_1$.

Figure 4:
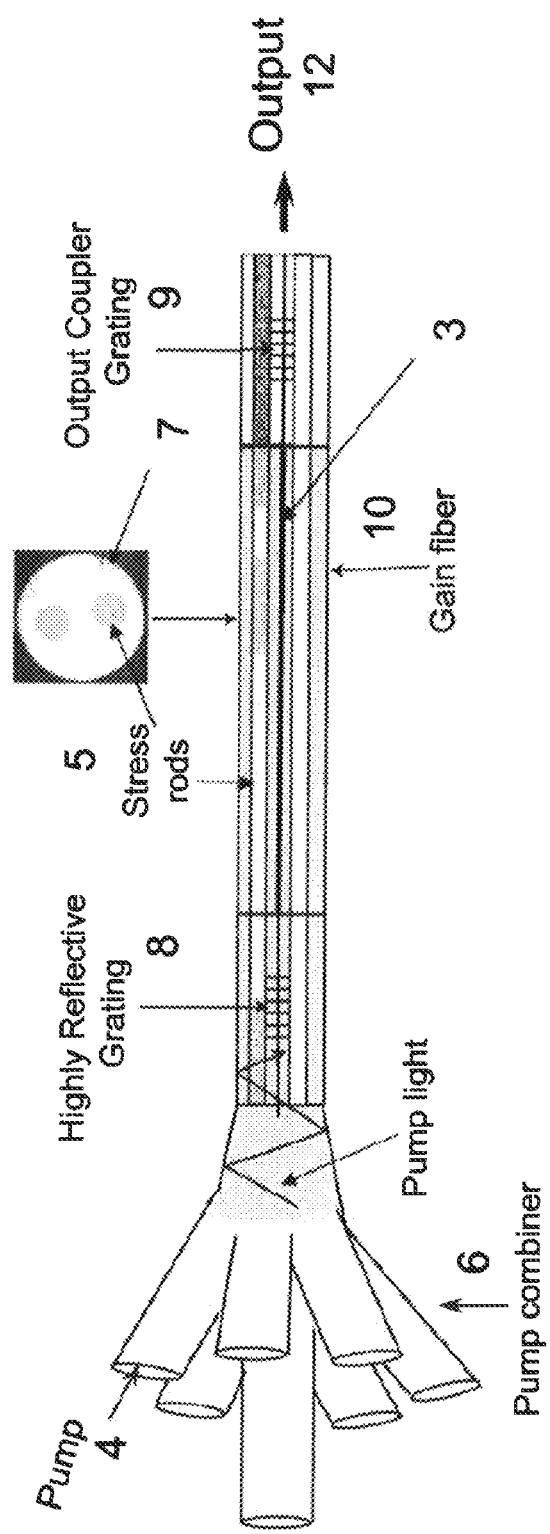
FIG. 4 is a diagram showing one embodiment of a double-clad (DC) polarization-maintaining (PM) optical fiber coupled to a pump combiner.
Figure 5:
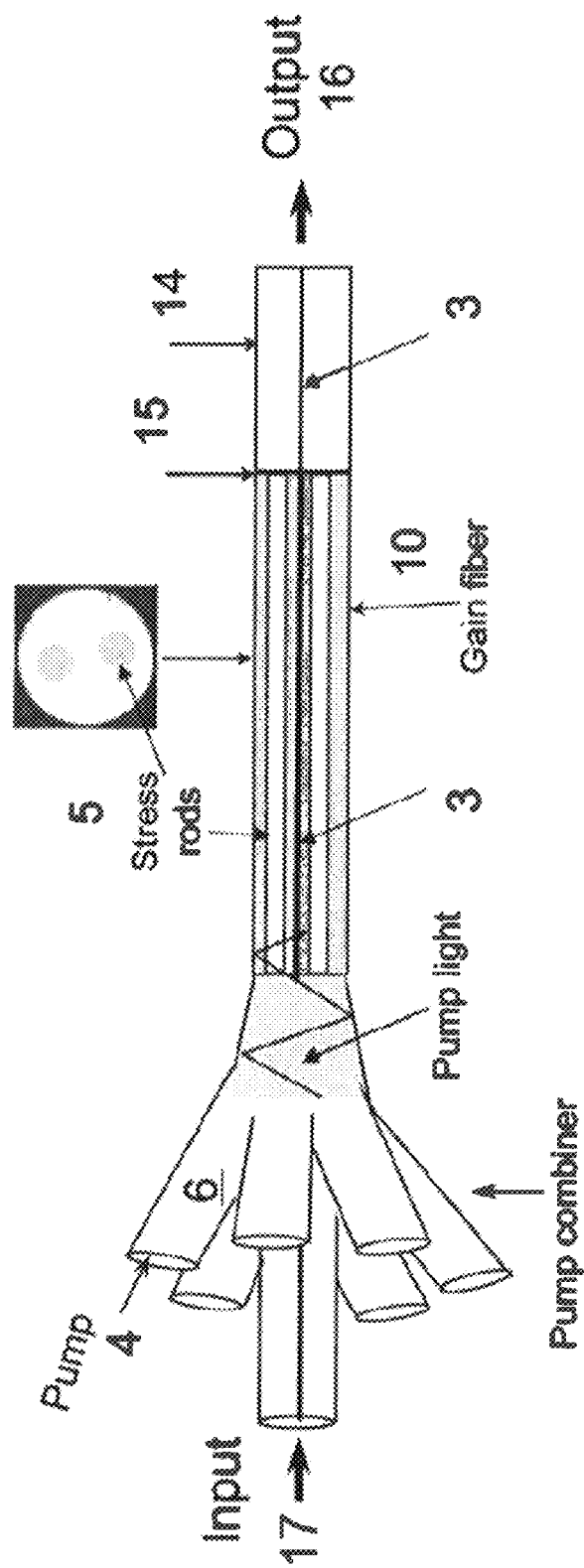
FIG. 5 is a diagram showing another embodiment of a PM-DC fiber coupled to a pump combiner.

FIG. 4 is a diagram showing one embodiment of a laser, while FIG. 5 is a diagram showing one embodiment of an amplifier. In both FIG. 4 and FIG. 5, the optical system comprises a PM-DC fiber 10 that is optically coupled to a pump combiner 6.

In the embodiment of FIG. 4, a lasing cavity is created between a highly-reflective grating 8 at the input end of the PM-DC fiber 10 and a partially-reflective output coupler grating 9 at the output end of the PM-DC fiber 10. Pump light 4 is introduced to the multi-port pump combiner 6 through pump diodes (not shown). The pump combiner 6 aggregates the pump light from the multiple inputs, and introduces the aggregated pump light into an inner cladding 7 of the PM-DC fiber 10.

In the embodiment of FIG. 5, an input signal is introduced through an input fiber 17. The input fiber 17 is spliced to the PM-DC fiber 10, which, in turn, is spliced to an output fiber 14. The output fiber 14 outputs the amplified signal 16. Similar to the laser in FIG. 4, the amplifier in FIG. 5 comprises a pump combiner 6 that introduces pump light to the inner cladding of the PM-DC fiber 10.

In the embodiments of FIGS. 4 and 5, some of the pump light 4 will be incident on the perpendicular leading edge of the stress rods 5 at the interface that is created by the splice 15. As explained with reference to FIGS. 1 through 3, that incident light refracts according to Snell's law. Furthermore, as the pump light 4 propagates through the PM-DC fiber 10, the pump light 4 traverses both the inner cladding 7 and the stress rods 5. Often, the stress rods 5 have a high concentration of boron (approximately 20M %) to provide a large mismatch in the coefficient of thermal expansion between the stress rods 5 and the silica inner cladding 7. This results in a significant index mismatch (also designated as index contrast, index difference, or $|\Delta n|$) between the stress rods 5 and the inner cladding 7, for example, $|\Delta n|=|(n_1^2-n_2^2)/(2n_1^2)|\approx 0.008$ or NA$\approx$0.15, which results in unacceptable pump loss and heating, as described with reference to FIGS. 1 and 2. By substantially matching the refractive indices of the cladding ($n_1$) and the stress rods ($n_2$), these high-power-related issues are mitigated by decreasing pump loss and reducing unwanted heating.

Although exemplary embodiments have been shown and described, it will be clear to those of ordinary skill in the art that a number of changes, modifications, or alterations to the disclosure as described may be made. All such changes, modifications, and alterations should therefore be seen as within the scope of the disclosure.

What is claimed is:

1. A high-power optical system, comprising:
   (a) a double-clad (DC) polarization-maintaining (PM) optical fiber comprising:
      (a1) a substantially perpendicular leading edge;
      (a2) a core comprising a first portion of the substantially perpendicular leading edge;
      (a3) an inner cladding surrounding the core, the inner cladding having an inner cladding refractive index ($n_1$), the inner cladding comprising a second portion of the substantially perpendicular leading edge; and
      (a4) a stress region located in the inner cladding, the stress region comprising a third portion of the substantially perpendicular leading edge, the stress region comprising a stress region refractive index ($n_2$), a difference between $n_2$ and $n_1$ being between substantially 0.001 and substantially 0.003, the stress region being stress rods exhibiting a configuration selected from the group consisting of:
         (a4A) a bowtie configuration;
         (a4B) a panda configuration; and
         (a4C) an elliptical region radially exterior to the core;
   (b) an input fiber core-match spliced to the core of the PM-DC fiber at the substantially perpendicular leading edge, the input fiber for introducing a signal to the core of the DC-PM optical fiber; and
   (c) a pump combiner optically coupled to the PM-DC fiber at the substantially perpendicular leading edge, the pump combiner for introducing pump light into the inner cladding at the substantially perpendicular leading edge, the pump combiner further for introducing pump light into the stress region at the substantially perpendicular leading edge.

2. The system of claim 1, further comprising:
pump diodes optically coupled to the pump combiner.

3. The system of claim 1, further comprising:
an output fiber core-match spliced to an output of the core of the PM-DC optical fiber.

* * * * *